US005596190A

United States Patent [19]
Li et al.

[11] Patent Number: 5,596,190
[45] Date of Patent: Jan. 21, 1997

[54] LIGHT COLLECTION DEVICE FOR A FILM IMAGE DIGITIZER

[75] Inventors: Yun Z. Li, Woodbury; Richard R. Lemberger, Forest Lake; Paul C. Schubert, Marine on St. Croix; Terrence H. Joyce, Lakeville; Jack K. Warren, Marine on St. Croix, all of Minn.

[73] Assignee: Minnesota Mining and Manufacturing Company, St. Paul, Minn.

[21] Appl. No.: 459,328

[22] Filed: Jun. 2, 1995

[51] Int. Cl.⁶ .................................................. H01J 3/14
[52] U.S. Cl. ........................... 250/236; 364/413.19
[58] Field of Search ............................... 250/234, 235, 250/236, 559.36, 559.24, 559.26, 559.4, 559.46, 559.49, 559.17; 356/430, 431, 239, 446; 382/227, 280, 294, 295; 364/413.19, 192

[56] References Cited

U.S. PATENT DOCUMENTS

| | | | |
|---|---|---|---|
| 4,315,318 | 2/1982 | Kato et al. | 364/515 |
| 4,317,179 | 2/1982 | Kato et al. | 364/515 |
| 4,568,984 | 2/1986 | Juergensen et al. | 250/236 |
| 4,725,891 | 2/1988 | Manian | 358/285 |
| 4,814,606 | 3/1989 | Lee et al. | 250/235 |
| 4,818,861 | 4/1989 | Horiuchi et al. | 250/235 |
| 4,955,067 | 9/1990 | Shimura | 382/62 |
| 5,172,419 | 12/1992 | Manian | 382/6 |
| 5,221,840 | 6/1993 | Boutet | 250/228 |
| 5,224,177 | 6/1993 | Doi et al. | 382/54 |
| 5,235,183 | 8/1993 | Whiting et al. | 250/236 |
| 5,235,510 | 8/1993 | Yamada et al. | 364/413.02 |
| 5,237,358 | 8/1993 | Yamada et al. | 354/298 |
| 5,241,459 | 8/1993 | Kaplan et al. | 362/298 |
| 5,257,340 | 10/1993 | Kaplan | 385/128 |
| 5,274,228 | 12/1993 | Kaplan | 250/227.31 |
| 5,321,520 | 6/1994 | Inga et al. | 358/403 |
| 5,343,308 | 8/1994 | Johnston | 358/445 |

FOREIGN PATENT DOCUMENTS

| | | |
|---|---|---|
| 222388B1 | 5/1987 | European Pat. Off. |
| 285122A2 | 10/1988 | European Pat. Off. |

OTHER PUBLICATIONS

Abe Sekkei Inc., "Special Feature of the Laser Film Reader Model 2904", May, 1992, pp. 1–4.
Whiting, Bruce R., et al., "High–resolution, high–performance radiographic film scanner", SPIE Vol. 1231 *Medical Imaging IV: Image Formation*, pp. 295–305, Jan. 1990.

*Primary Examiner*—Que T. Le
*Attorney, Agent, or Firm*—Carolyn A. Bates; Steven J. Shumaker

[57] ABSTRACT

A light collection device for use in a film image digitizing apparatus comprises a housing having an elongated aperture extending along a light beam scan line. The aperture receives light transmitted through a sheet of film from a light source. A diffusing member, disposed within the aperture and extending along the scan line, optically diffuses the light received by the aperture. The housing may include one or more reflective interior surfaces. A linear array of photodiodes, disposed within the housing and extending along the scan line, detects the light diffused by the diffusing member. Each of the photodiodes generates an analog signal representing an intensity of the detected light for each of a plurality of pixels. A summing circuit, coupled to each of the photodiodes, sums the analog signals generated by the photodiodes for each of the pixels to produce an output analog signal representing an overall intensity of the light transmitted through the sheet of film for each of the pixels.

19 Claims, 5 Drawing Sheets

LIGHT COLLECTION DEVICE FOR A FILM IMAGE DIGITIZER

FIELD OF THE INVENTION

The present invention relates to film image digitizers, and, more particularly, to light collection devices for use in such digitizers.

DISCUSSION OF RELATED ART

A film image digitizer converts an image formed on a sheet of film into a set of digital values. Each of the digital values represents a transmittance of the film at a particular pixel in the image. The transmittance provides an indication of an optical density associated with the pixel in the image. Thus, the digital transmittance values can be converted into digital optical density values or digital brightness values. The film digitizer stores the digital values obtained from the film as a pixel matrix image file. The image file can be archived and accessed for display on a monitor.

A film image digitizer includes a light source such as, for example, a laser. The light source emits a beam of light that is focused and scanned across the film to illuminate individual pixels. A light collection device, positioned on a side of the film opposite the light source, measures the intensity level of light transmitted through the film in response to illumination by the light source. The intensity level is indicative of the transmittance value of the film at each pixel and, indirectly, indicative of the optical density or brightness of the image formed on the film at each pixel. A data acquisition system receives from the light collection device analog signals indicative of the measured transmittance values. The data acquisition system includes a analog-to-digital converter that converts the analog signals into digital values. The data acquisition system stores the resulting digital values at the appropriate pixel address in the image file.

Many film image digitizers use as a light collection device either light integrating chambers with photomultiplier tubes or charge-coupled device (CCD) arrays with light bars. The photomultiplier tubes or CCD arrays used in such light collection devices convert light received through the film into analog signals. Unfortunately, CCD arrays have a limited dynamic range and suffer from light scattering produced by optical elements that focus the film image onto the array. Light collection devices using integrating chambers and a scanned laser beam can provide a large dynamic range, but are costly to make and require photomultiplier tubes due to low light collection efficiency.

U.S. Pat. No. 4,814,606, to Lee et al., discloses a laser scanning digitizer incorporating as a light collection device an array of photodiodes. The photodiodes are arranged in a curvilinear array with the active areas of the photodiodes being butted to one another. A curved film receiving field is translated relative to the photodiode array in a first direction as a laser scans the film in a second direction. The photodiodes are coupled in parallel to a single summing amplifier that produces an output analog signal representative of the light transmitted through the film. The photodiode array used by this digitizer provides improved light collection efficiency, but suffers poor signal to noise ratio and poor response time due to the combined capacitance of the photodiodes and the input voltage noise of the amplifier.

In view of the foregoing disadvantages associated with existing light collection devices, there exists a need for an improved light collection device that combines low cost, a wide dynamic range, improved signal to noise ratio, and faster settling time.

SUMMARY OF THE INVENTION

The present invention is directed to an apparatus for digitizing an image formed on a sheet of film and to a light collection device for use in an apparatus for digitizing an image formed on a sheet of film. In accordance with the present invention, the light collection device uses a linear array of low-cost photodiodes providing a wide dynamic range. The light collection device of the present invention also provides a high signal-to-noise ratio with faster settling time.

In a first embodiment, the present invention provides an apparatus for digitizing an image formed on a sheet of film, the apparatus comprising a light source for emitting a beam of light, a mechanism for scanning the beam of light in a scan line across the sheet of film to illuminate a plurality of pixels on the sheet of film, a light collection device including a housing having an elongated aperture extending along the scan line, the aperture receiving light transmitted through the sheet of film from the light source, a diffusing member, disposed within the aperture and extending along the scan line, for optically diffusing the light received by the aperture, a linear array of photodiodes, disposed within the housing and extending along the scan line, for detecting the light diffused by the diffusing member, the linear array of photodiodes being displaced a distance from the diffusing member, and each of the photodiodes generating an analog signal representing an intensity of the detected light for each of the pixels, and a summing circuit, coupled to each of the photodiodes, for summing the analog signals generated by the photodiodes for each of the pixels to produce an output analog signal representing an overall intensity of the light transmitted through the sheet of film from the light source for each of the pixels, and an analog-to-digital converter, electrically coupled to the summing circuit, for converting the output analog signal for each of the pixels to a digital value.

In a second embodiment, the present invention provides a light collection device for use in an apparatus for digitizing an image formed on a sheet of film, wherein the apparatus comprises a light source for emitting a beam of light, a mechanism for scanning the beam of light in a scan line across the sheet of film to illuminate a plurality of pixels on the sheet of film, the light collection device comprising a housing having an elongated aperture extending along the scan line, the aperture receiving light transmitted through the sheet of film from the light source, a diffusing member, disposed within the aperture and extending along the scan line, for optically diffusing the light received by the aperture, a linear array of photodiodes, disposed within the housing and extending along the scan line, for detecting the light diffused by the diffusing member, the linear array of photodiodes being displaced a distance from the diffusing member, and each of the photodiodes generating an analog signal representing an intensity of the detected light for each of the pixels, and a summing circuit, coupled to each of the photodiodes, for summing the analog signals generated by the photodiodes for each of the pixels to produce an output analog signal representing an overall intensity of the light transmitted through the sheet of film from the light source for each of the pixels.

In a third embodiment, the present invention provides an apparatus for digitizing an image formed on a sheet of film, the apparatus comprising a light source for emitting a beam of light, a mechanism for scanning the beam of light in a scan line across the sheet of film to illuminate a plurality of pixels on the sheet of film, a mechanism for transporting the sheet of film in a direction perpendicular to the scan line, the transporting mechanism including a single pair of rollers, the single pair of rollers including a drive roller and a guide roller defining a nip contact for receiving the sheet of film and driving the sheet of film in the direction perpendicular to the scan line, a light collection device for detecting the light diffused by the diffusing member, and for generating an analog signal representing an intensity of the detected light for each of the pixels, and an analog-to-digital converter, electrically coupled to the summing circuit, for converting the output analog signal for each of the pixels to a digital value.

In a fourth embodiment, the present invention provides an apparatus for digitizing an image formed on a sheet of film, the apparatus comprising a light source for emitting a beam of light, a mechanism for scanning the beam of light in a scan line across the sheet of film to illuminate a plurality of pixels on the sheet of film, a light collection device for detecting the light diffused by the diffusing member, and for generating an analog signal representing an intensity of the detected light for each of the pixels, an analog-to-digital converter, electrically coupled to the summing circuit, for converting the output analog signal for each of the pixels to a digital value, and a calibration device comprising means for activating the light source, the scanning mechanism, the light collection device, and the analog-to-digital converter to perform a calibration digitization mode in which the scanning mechanism scans the light beam in the scan line across the aperture of the light collection device without presence of the sheet of film, means for storing the digital values generated by the analog-to-digital converter for the pixels during the calibration digitization mode, means for calculating, for each of the digital values, a deviation of the respective digital value from a pixel reference value, means for calculating, for each of the digital values, a weighting factor sufficient to adjust the respective digital value to eliminate the deviation, and means for adjusting each of the digital values, during a normal digitization mode of the digitizing apparatus, according to the weighting factor calculated for the respective digital value, thereby substantially eliminating the deviation.

In a fifth embodiment, the present invention provides an apparatus for digitizing an image formed on a sheet of film, the apparatus comprising a light source for emitting a beam of light, a mechanism for scanning the beam of light in a scan line across the sheet of film to illuminate a plurality of pixels on the sheet of film, a light collection device including a housing having an elongated aperture extending along the scan line, the aperture receiving light transmitted through the sheet of film from the light source, wherein the housing includes one or more reflective interior surfaces, a diffusing member, disposed within the aperture and extending along the scan line, for optically diffusing the light received by the aperture, a linear array of photodiodes, disposed within the housing and extending along the scan line, for detecting the light diffused by the diffusing member, the linear array of photodiodes being displaced a distance from the diffusing member, and each of the photodiodes generating an analog signal representing an intensity of the detected light for each of the pixels, and a summing circuit, coupled to each of the photodiodes, for summing the analog signals generated by the photodiodes for each of the pixels to produce an output analog signal representing an overall intensity of the light transmitted through the sheet of film from the light source for each of the pixels, and an analog-to-digital converter, electrically coupled to the summing circuit, for converting the output analog signal for each of the pixels to a digital value.

In a sixth embodiment, the present invention provides a light collection device for use in an apparatus for digitizing an image formed on a sheet of film, wherein the apparatus comprises a light source for emitting a beam of light, a mechanism for scanning the beam of light in a scan line across the sheet of film to illuminate a plurality of pixels on the sheet of film, the light collection device comprising a housing having an elongated aperture extending along the scan line, the aperture receiving light transmitted through the sheet of film from the light source, wherein the housing includes one or more reflective interior surfaces, a diffusing member, disposed within the aperture and extending along the scan line, for optically diffusing the light received by the aperture, a linear array of photodiodes, disposed within the housing and extending along the scan line, for detecting the light diffused by the diffusing member, the linear array of photodiodes being displaced a distance from the diffusing member, and each of the photodiodes generating an analog signal representing an intensity of the detected light for each of the pixels, and a summing circuit, coupled to each of the photodiodes, for summing the analog signals generated by the photodiodes for each of the pixels to produce an output analog signal representing an overall intensity of the light transmitted through the sheet of film from the light source for each of the pixels.

Additional features and advantages of the present invention will be set forth in part in the description that follows, and in part will be apparent from the description, or may be learned by practice of the present invention. The advantages of the present invention will be realized and attained by means particularly pointed out in the written description and claims hereof, as well as in the appended drawings.

It is to be understood that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate an exemplary embodiment of the present invention and together with the description serve to explain the principles of the invention.

DETAILED DESCRIPTION OF THE PREFERRED EMBODIMENTS

Figure 1:
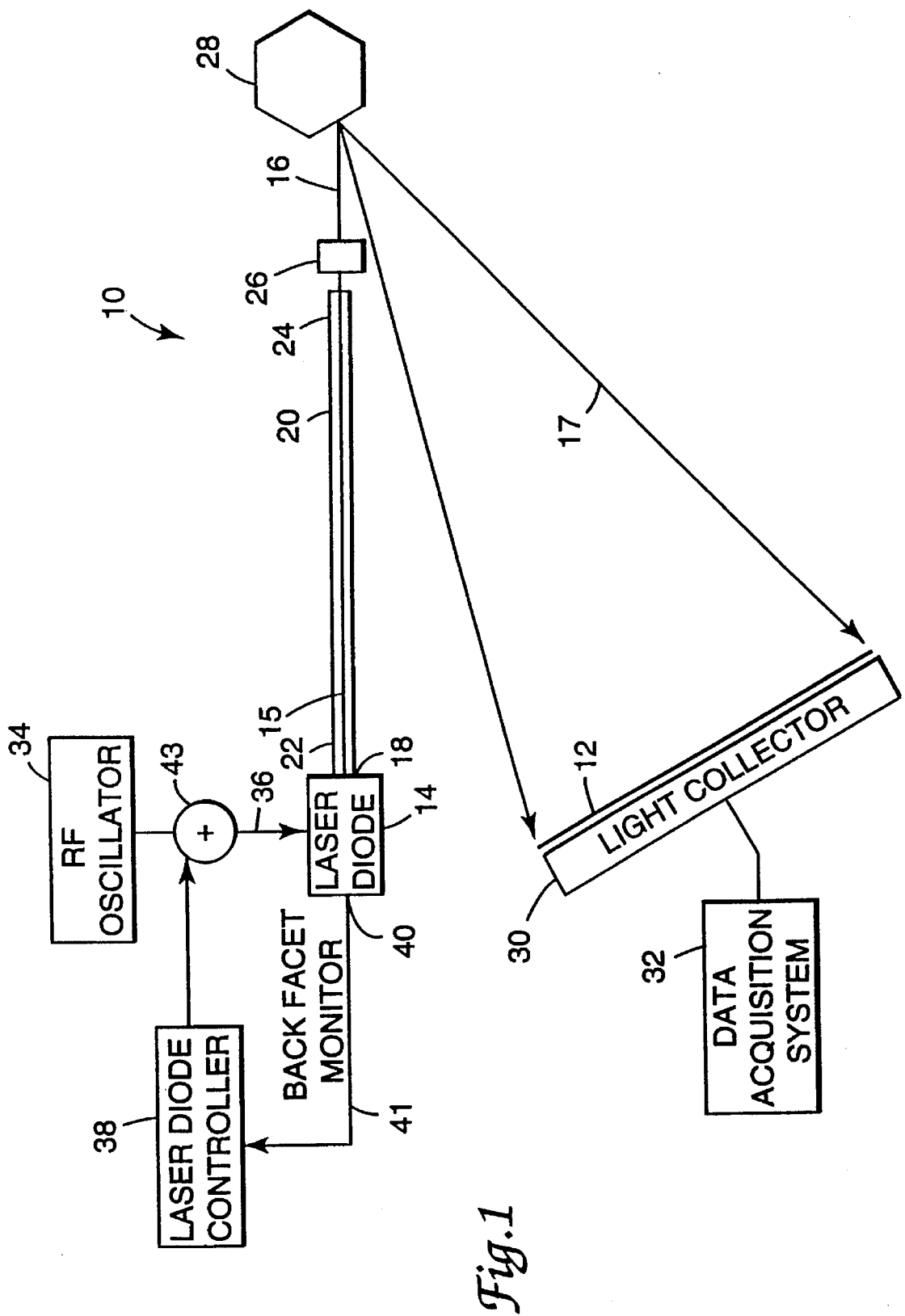
FIG. 1 is a schematic diagram of an exemplary apparatus for digitizing an image formed on a sheet of film, in accordance with the present invention.

FIG. 1 shows an exemplary apparatus 10 for digitizing an image formed on a sheet 12 of film. A detailed description of a digitizing apparatus substantially conforming to digitizing apparatus 10 is provided in copending and commonly assigned U.S. patent application Ser. No. 08/458,431, to Schubert et al, filed Jun. 2, 1995 bearing attorney docket no. 51665USA5A, and entitled "FILM IMAGE DIGITIZER USING OPTICAL FIBER-COUPLED LASER DIODE." The entire content of the above-identified copending patent application is incorporated herein by reference.

As shown in FIG. 1, digitizing apparatus 10 comprises a light source in the form of a laser diode 14 that emits a laser beam 15 from a front facet 18. An optical fiber 20 has an input end 22 coupled to front facet 18 of laser diode 14. The optical fiber 20 receives laser beam 15 from front facet 18 of laser diode 14 and transmits the laser beam along the length of the optical fiber to an output end 24. An optical module 26, positioned adjacent output end 24 of optical fiber 20, focuses laser beam 15 transmitted from the optical fiber to produce a focused beam 16. A scanning mechanism 28 receives focused laser beam 16 from optical fiber 20 via optical module 26 and produces a beam 17 that scans film sheet 12. As scanning mechanism 28 scans laser beam 17 across film sheet 12, the film sheet ordinarily will be translated relative to the scanning mechanism in a second direction substantially perpendicular to the first direction. It is conceivable, however, that the scan can be carried out at an angle relative to the direction of translation.

A light collection device 30 detects light transmitted through film sheet 12 in response to the scanning of laser beam 17 across the film sheet. The light collection device 30 measures the level of intensity of the light transmitted through film sheet 12 at each pixel and generates analog signals indicative of the measured intensity levels. The measured intensity levels are indicative of the transmittance value of film sheet 12 at each pixel. The light collection device 30 preferably includes a linear array of photodiodes within a light collection compartment oriented to receive light transmitted through film sheet 12. A light collection device 30 constructed in accordance with the present invention will be described in greater detail later in this description.

As further shown in FIG. 1, a data acquisition system 32 receives the analog signals from light collection device 30 and converts the analog signals into digital values using an analog-to-digital converter system. The data acquisition system 32 then stores the digital values at the appropriate pixel address in an image file. The transmittance represented by the digital values provides a linear value that is indirectly indicative of either optical density or brightness. Thus, data acquisition system 32 may further convert the digital transmittance values to digital optical density values or digital brightness values using a table or other suitable conversion means. The image file created by data acquisition system 32 can be archived and accessed for display on a monitor.

An example of a suitable analog-to-digital converting system for use in data acquisition system is disclosed in copending and commonly assigned U.S. patent application Ser. No. 08/458,986, to Lemberger, filed Jun. 2, 1995, bearing attorney docket no. 51727USA3A, and entitled "SYSTEM AND METHOD FOR ANALOG-TO-DIGITAL CONVERSION IN A FILM IMAGE DIGITIZER." The entire content of the above-identified copending patent application is incorporated herein by reference.

As further shown in FIG. 1, a radio-frequency (RF) oscillator 34 provides power to laser diode 14, as indicated by line 36. A laser diode controller 38 receives feedback from back facet monitor 40 of laser diode 14, as indicated by line 41. The feedback is an analog signal representing the laser beam output power of laser diode 14, as measured by a built-in photodiode associated with back facet monitor 40. The feedback enables laser diode controller 38 to stabilize the laser beam output power of laser diode 14. Specifically, laser diode controller 38 generates a drive signal as a function of the feedback signal received from back facet monitor 38 to control laser beam output power. The drive signal generated by laser diode controller 38 is summed with the power signal generated by RF oscillator 34, as indicated by summing element 43. The amplitude of the signal generated by RF oscillator 34 is fixed so that, at the selected average output power, the laser diode is driven down below threshold once each cycle by the oscillator. The feedback signal provided to laser diode controller 38 from back facet monitor 40 eliminates the need for a beam splitter element in the main optical path of the laser beam and an accompanying discrete photodetector for measurement of the split beam.

The use of RF oscillator 34 is desirable to avoid the appearance of visible interference fringes in the digitized image. Specifically, RF oscillator 34 is used to modulate laser diode 14 at high frequencies, e.g., 300 to 1000 megahertz, to broaden the spectrum of laser beam 15. The resulting broad spectrum scanned laser beam 17 produces less laser light interference arising from multiple reflections within the layers of film sheet 12. The reduced occurrence of interference reduces or eliminates the appearance of visible interference fringes and other artifacts in the digitized image, thereby preserving image quality.

Figure 2:
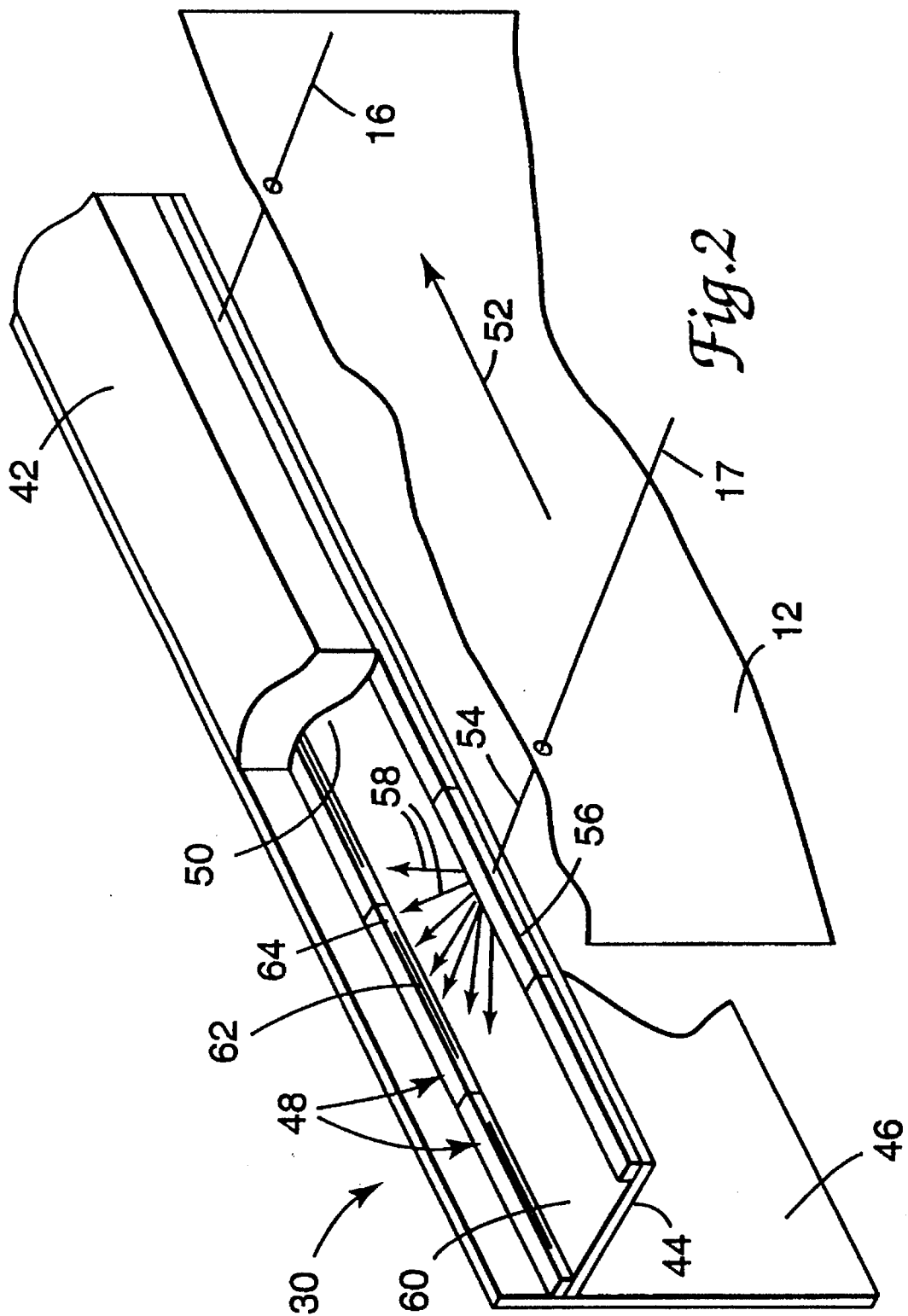
FIG. 2 is a partial perspective view of an exemplary light collection device for use in a digitizing apparatus, in accordance with the present invention.

FIG. 2 is a partial perspective diagram of an exemplary light collection device 30, in accordance with the present invention. The light collection device 30 may be used in a digitizing apparatus such as digitizing apparatus 10 of FIG. 1. As shown in FIG. 2, light collection device 30 includes a narrow, rectangular housing having a top surface 42 and a bottom surface 44. The top and bottom surfaces 42, 44 are mounted on a back surface 46. The back surface 46 preferably comprises a circuit board on which a linear array of photodiodes 48 and associated circuitry also are mounted. Side surfaces (not shown) are provided to join top and bottom surfaces 42, 44 together, maintaining a light-tight enclosure.

The top and bottom surfaces 42, 44 of the light collection device housing define an elongated aperture 50. The aperture 50 extends along a scan line 52. The scan line 52 corresponds to a line along which laser beam 17 is scanned by scanning mechanism 28 to illuminate film sheet 12, as shown in FIG. 1. As scanning mechanism 28 scans laser beam 17 across film sheet 12, the film sheet is transported in a direction perpendicular to scan line 52 at distance from aperture 50 of, for example, less than one millimeter.

The elongated aperture 50 receives light 54 transmitted through film sheet 12 in response to illumination by laser beam 17. The aperture 50 should be long enough to accommodate the scanning of both small and large film sizes. Larger film sizes for chest radiography, for example, are on the order of 14 inches by 17 inches (355.6 millimeters by 431.8 millimeters) in size. Thus, aperture 50 has a length of at least 355.6 millimeters, and preferably a length in the range of approximately 355.6 to 360 millimeters. The upper bound of 360 millimeters corresponds to the length necessary to accommodate an array of nine photodiodes of a particular type arranged end-to-end, as will be described later relative to an exemplary embodiment of the present invention. The height of aperture 50, in a direction perpendicular to scan line 52, should be sized narrowly to enhance light collection efficiency. However, an excessively narrow aperture height may undesirably complicate alignment of aperture 50 with scan line 52. An aperture height of approximately 2 to 4 millimeters, and preferably 3 millimeters, for example, has been observed to provide acceptable light collection efficiency without producing alignment problems.

A diffusing member 56, disposed within aperture 50 and extending along scan line 52, optically diffuses the light 54 received by the aperture. The optically diffused light 58 is transmitted to the linear array of photodiodes 48. The diffusing member 56 should have a length and height sized to match the length and height of aperture 50 so that the diffusing member fills the entire aperture to diffuse all light received by the aperture. Thus, like aperture 50, diffusing member 56 may be sized to have a length extending along scan line 52 on the order of 360 millimeters and a height extending in a direction perpendicular to the scan line of approximately 2–4, and preferably 3, millimeters.

The diffusing member 56 may be constructed from an opalescent plastic material. A preferred opalescent plastic material is type 2447 Plexiglas™ material, available from Rhom & Haas Corporation, of Philadelphia, Pa. The width of diffusing member 56, in a direction perpendicular to both the height and length of the diffusing member, should be selected to provide good diffusion of light 54 without too much attenuation. A high degree of diffusion of light 54 is desirable to spread the light received through film sheet 12 over the linear array of photodiodes 48. As the width of diffusing member 56 increases, diffusion increases. However, increased width also results in increased attenuation of the light, reducing the light collection efficiency of the overall light collection device 30. Thus, a trade-off should be made between more diffusion and less attenuation. A diffusing member 56 made of type 2447 Plexiglas™ material has been observed to provide an acceptable trade-off between diffusion and attenuation at a width of approximately 3 millimeters.

The top surface 42 and bottom surface 44 of the light collection device housing further define a narrow, rectangular interior light collection chamber 60 that separates diffusing member 56 from photodiodes 48. Thus, the linear array of photodiodes 48 is displaced a distance from diffusing member 56. The interior light collection chamber 60 has a height and length dictated by the height and length of both aperture 52 and diffusing member 56. The width of interior light collection chamber 60 determines the distance of a gap between diffusing member 56 and photodiodes 48. The size of the gap affects the pattern of diffused light 58 received by the photodiodes. An acceptable distribution of diffused light 58 across photodiodes 48 has been observed with an interior light collection chamber gap width extending between the photodiodes and diffusing member 56 of approximately 22 millimeters. The chamber gap width may be adjusted to provide a more uniform distribution of diffused light on photodiodes 48 if greater attenuation is acceptable.

The interior light collection chamber 60 preferably includes one or more reflective interior surfaces. For example, the interior surface of interior light collection chamber 60, including interior surfaces of both top surface 42 and bottom surface 44 and the sides joining the top and bottom surfaces together, may include a reflective film or coating. The reflective film or coating serves to direct diffused light 58 produced by diffusing member 56 toward photodiodes 48 with minimal attenuation. The reflective material may comprise, for example, 3M™ Silverlux™ Reflector film, commercially available from Minnesota Mining & Manufacturing, of St. Paul, Minn. The Silverlux™ film provides a reflectivity of approximately 98 percent and, with its adhesive backing, is very easy to apply. The incorporation of reflective film or coating within interior light collection chamber 60 prevents significant absorption that can attenuate the diffused light prior to incidence on photodiodes 48. The use of Silverlux™ reflective film has been observed to greatly enhance the overall light collection efficiency of light collection device 30.

The linear array of photodiodes 48 detects the light 58 diffused by diffusing member 56 and transmitted across interior light collection chamber 60. In response to the detected light 58, each of photodiodes 48 generates an analog signal representing the intensity of the detected light for each of a plurality of pixel positions scanned by light beam 17. The photodiodes 48 are coupled to a summing circuit that sums the analog signals generated by the photodiodes for each of the pixels to produce an output analog signal representing an overall intensity of the light transmitted through film sheet 12 at each pixel position. Both photodiodes 48 and the summing circuit can be mounted directly on circuit board 46.

The photodiodes 48 may comprise, for example, an array of nine photodiodes disposed adjacent one another in an end-to-end manner in alignment with aperture 50 and thus scan line 52. An example of a suitable photodiode is the S2551-01 PIN silicon photodiode, commercially available from Hamamatsu, of Hamamatsu City, Japan. The S2551-01 photodiode has a length of approximately 40 millimeters, a height of approximately 3 millimeters, and a width of approximately 3 millimeters. Each photodiode 48 includes an active light receiving area 62. In accordance with the present invention, active area 62 is configured to have a length of approximately 29 millimeters and a height of approximately 1.2 millimeters. An array of nine photodiodes positioned end-to-end produces an overall length of approximately 360 millimeters, approximately equal to the length of aperture 50. A photodiode width of approximately 3 millimeters, in combination with an interior chamber width of approximately 22 millimeters and a diffusing member width of approximately 3 millimeters, produces a light collection device 30 having an overall width of approximately 28 millimeters and an overall length of approximately 360 millimeters. Variations in the dimensions of photodiodes 48 and diffusing member 56 may, of course, produce variations in the overall dimensions of light collection device 30. The height of light collection device 30 also may vary but is determined by the heights of photodiodes 48, diffusing member 56, top surface 42, and bottom surface 44.

Figure 3:
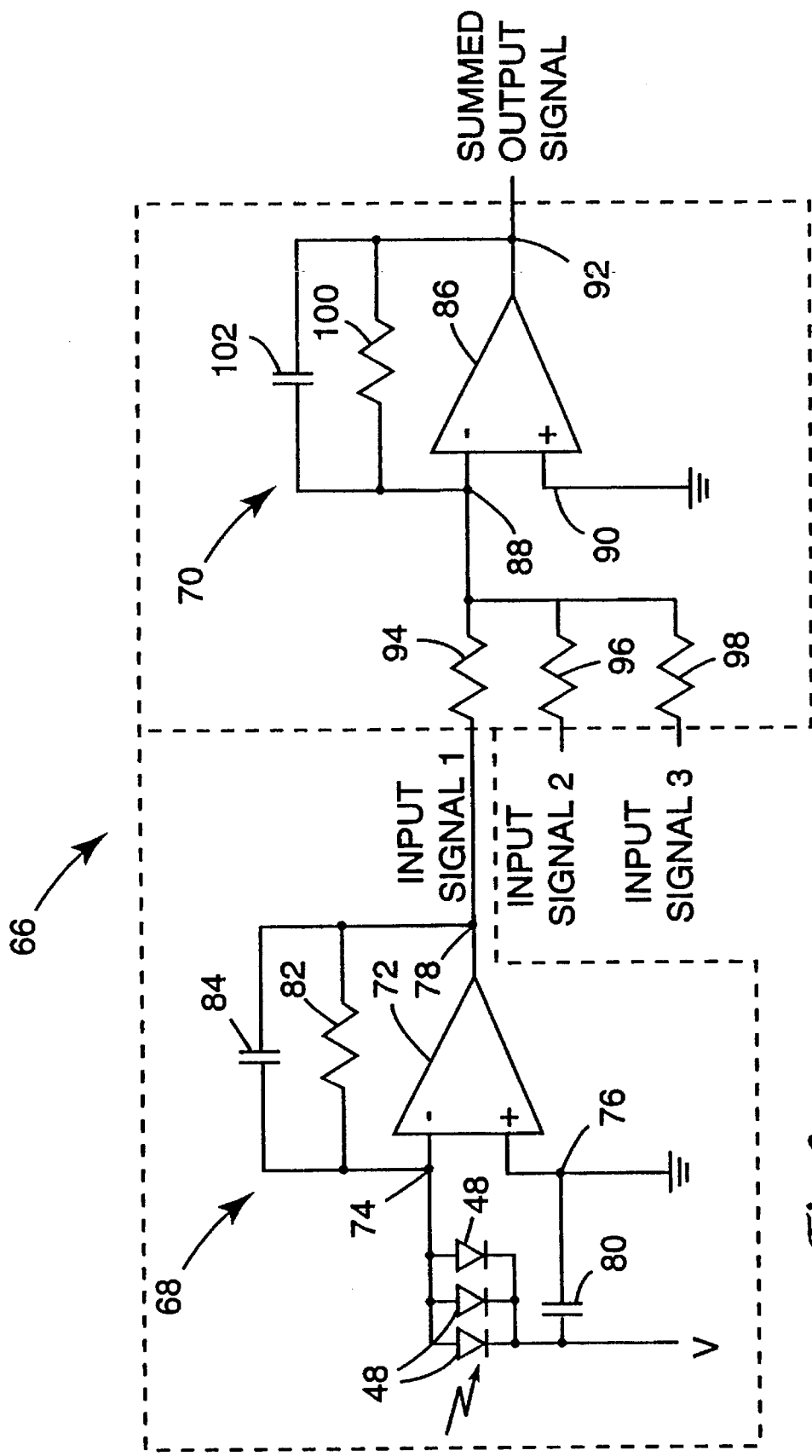
FIG. 3 is a circuit diagram illustrating an exemplary circuit for summing analog signals generated by the light collection device shown in FIG. 2, in accordance with the present invention.

FIG. 3 is a circuit diagram illustrating an exemplary circuit 66 for summing analog signals generated by light collection device 30 shown in FIG. 2, in accordance with the present invention. The circuit 66 includes a plurality of first-stage summing circuits 68, only one of which is shown in FIG. 3. Each of first-stage summing circuits 68 sums the analog signals generated by one or more of photodiodes 48 to produce a first summed analog signal. In the example of FIG. 3, first-stage summing circuit 68 sums the analog signals generated by three of photodiodes 48 to produce a summed analog signal indicated as INPUT SIGNAL 1. With nine photodiodes, circuit 66 may include three different first-stage summing circuits 68 producing summed analog signals INPUT SIGNAL 1, INPUT SIGNAL 2, INPUT SIGNAL 3 for three different sets of three photodiodes 48. A second-stage summing circuit 70 further sums the summed analog signals INPUT SIGNAL 1, INPUT SIGNAL 2, INPUT SIGNAL 3 produced by first-stage summing circuits 68 to produce an output analog signal indicated as SUMMED OUTPUT SIGNAL.

As shown in the example of FIG. 3, first-stage summing circuit 68 is configured as a current-to-voltage converter. The first-stage summing circuit 68 includes an operational amplifier 72 having a inverting input 74, a non-inverting input 76, and an output 78. Three photodiodes 48 are coupled in parallel between inverting input 74 of operational amplifier 72 and a bias voltage V. A capacitor 80 can be coupled between bias voltage V and ground to filter transient signals from the power and ground lines. The non-inverting input 76 of operational amplifier 72 is coupled to ground. A resistor 82 and a capacitor 84, coupled in parallel between inverting input 74 and output 78, can be adjusted to achieve a desired bandwidth. The operational amplifier 72 preferably comprises an ultra low noise amplifier. An example of a suitable operational amplifier is the AD797, commercially available from Analog Devices, of Norwood, Mass. The AD797 operational amplifier circuit is fast enough to settle to within 0.1% of its final value within 0.5 microseconds for a step transition of 5 volts, with a peak signal-to-rms noise ratio of approximately 100,000:1. The period of 0.5 microseconds corresponds to a digitization rate of two million pixels per second.

As further shown in the example of FIG. 3, second-stage summing circuit 70 includes an operational amplifier 86 having an inverting input 88, a non-inverting input 90, and an output 92. Like operational amplifier 72 of first-stage summing circuit 68, operational amplifier 86 of second-stage summing circuit 70 preferably includes an ultra low noise AD797 operational amplifier circuit. The inverting input 88 of operational amplifier 86 receives summed input signals INPUT SIGNAL 1, INPUT SIGNAL 2, and INPUT SIGNAL 3 from first-stage summing circuits 68 via series input resistors 94, 96, 98, respectively. The non-inverting input 90 is coupled to ground. A capacitor 101 and resistor 100 are coupled in parallel between inverting input 88 and output 92 determine the bandwidth and gain of second-stage summing circuit 70. The second-stage summing circuit 70 sums the summed input signals INPUT SIGNAL 1, INPUT SIGNAL 2, and INPUT SIGNAL 3 and produces at output 92 the SLIMMED OUTPUT SIGNAL. The SUMMED OUTPUT SIGNAL is provided to the input of an analog-to-digital converter (not shown) and converted into a digital value that is stored at an appropriate position in a pixel matrix image file.

The length of active area 62 of each photodiode 48 leaves an inactive area ("dead space") 64 between each of the adjacent photodiodes of approximately 11 millimeters in length. The dead space ordinarily would produce a "ripple" in the analog signal produced by light collection device 30. In other words, as light beam 17 is scanned along scan line 52, the light beam would be received by areas of the photodiodes spatially aligned with each point on the scan line. If the light beam 17 were spatially aligned with an active area 62 of one of the photodiodes 48, the light beam would be directly received by the photodiode and would produce a relatively large analog signal. If the light beam were spatially aligned with one of the dead spaces between adjacent photodiodes 48, however, the beam would not be directly received by either photodiode, resulting in a decrease in the analog signal produced by light collection device 30. The decreased signal amplitude at spatial positions of light collection device 30 corresponding to dead spaces would produce the appearance of a ripple in signals obtained along scan line 52.

The diffusing member 46 incorporated in light collection device 30, separated from photodiodes 48 by the interior gap of chamber 60, serves in conjunction with the reflective film or coating to greatly reduce the ripple occurring in the analog signal produced by the light collection device. The diffusing member 46 optically diffuses the light received at each spatial position along aperture 52 so that the light is not concentrated on a corresponding spatial position of the linear array of photodiodes 48. Rather, the diffused light is widely distributed across the interior gap over photodiodes 48, thereby minimizing the ripple effect as the light beam passes across inactive areas of the photodiode array. The reflective film or coating prevents significant attenuation of the diffused light prior to incidence on active areas 62 of photodiodes 48.

Figure 4:
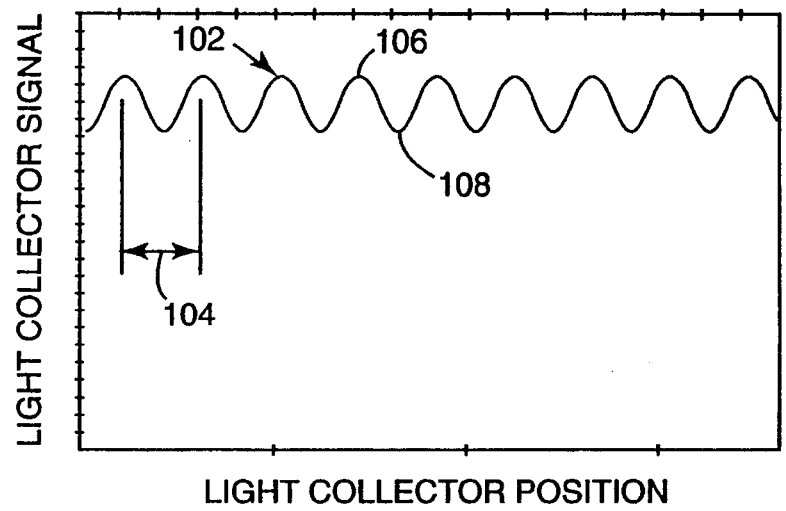
FIG. 4 is a graph illustrating signal power versus spatial position for light collected by the light collection device of FIG. 2.

FIG. 4 is a graph illustrating signal power versus spatial position for light collected by light collection device 30 of FIG. 2, in accordance with the present invention. The graph of FIG. 4 plots signal power 102 produced by light collection device 30 as the light beam is scanned along the array of photodiodes 48. Reference numeral 104 indicates the amplitude variation in signal power for a spatial shift between the center of the active area 62 of one photodiode 48 to the center of the active area of another photodiode. Reference numeral 106 indicates a maximum for signal power 102, whereas reference numeral 108 indicates a minimum for signal power. As is apparent from the graph, signal power 102 decreases to the minimum value 108 at the spatial positions midway between the centers of the active areas of adjacent photodiodes 48. This decrease causes the appearance of ripple in the output signal. In accordance with the present invention, however, the difference between the maxima and minima of signal power 102 with the use of diffusing member 56, in conjunction with Silverlux™ film and an approximately 22-millimeter interior gap in chamber 60, has been observed to be only approximately 20% of average signal power.

Figure 5:
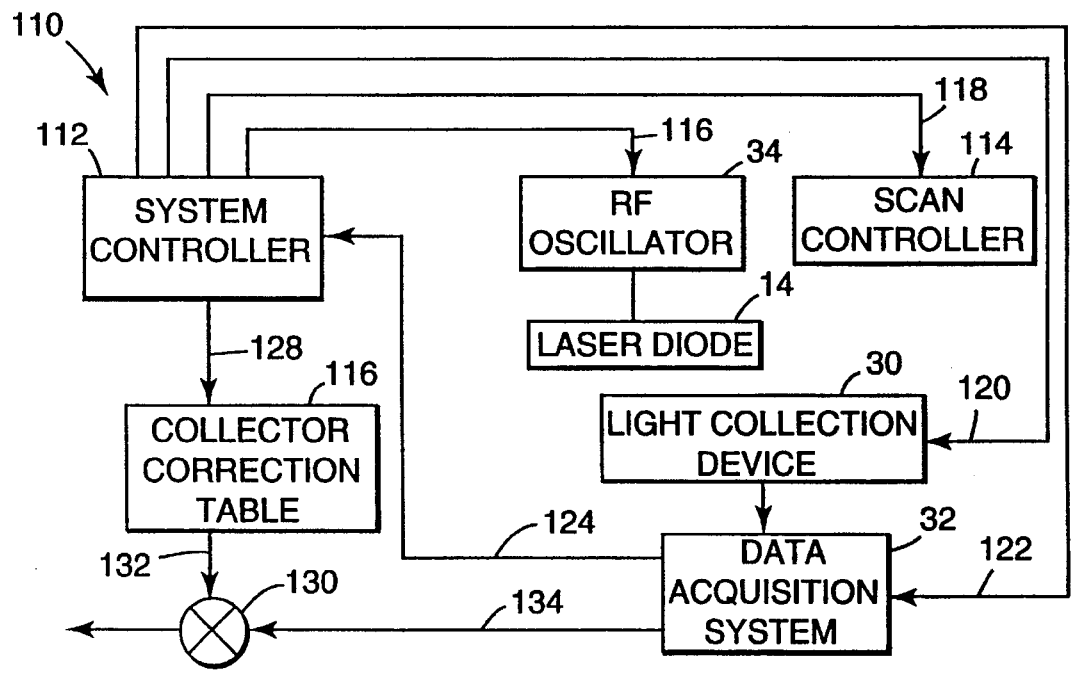
FIG. 5 is a functional block diagram of a calibration system for reducing ripple in signals generated by the light collection device shown in FIG. 2, in accordance with the present invention.

FIG. 5 is a functional block diagram of a calibration system 110 for further reducing ripple in signals obtained from light collection device 30 shown in FIG. 2, in accordance with the present invention. The calibration system 110 may form part of data acquisition system 32 shown in FIG. 1. As shown in FIG. 5, calibration system 110 includes a system controller 112 programmed to execute a calibration routine. In the calibration routine, system controller 112 activates laser diode 24, a scan controller 114 associated with scanning mechanism 28, light collection device 30, and an analog-to-digital converter associated with data acquisition system 32, as indicated by lines 116, 118, 120, and 122, respectively. In response, scan controller 114 controls scanning mechanism 28 to scan the laser light beam in scan line 52 across aperture 50 of light collection device 30 without presence of film sheet 12. Performance of the scanning operation without the presence of film sheet 12 in the calibration mode allows each pixel location of light collection device 30 to be read under the same conditions. The calibration mode enables correction of spatial variations in light collection efficiency and laser power intensity. Ripple in the response of the light collection device generally is the source of variation in fixed-pattern collection efficiency, whereas dust particles or other optical imperfections generally are the source of variation in laser power intensity.

In the calibration digitization mode, light collection device 30 generates an analog signal for light received at each pixel position along scan line 52, as in a normal digitization mode. The analog-to-digital converter associated with data acquisition system 32 then converts the analog signals to digital values, and transmits the digital values to system controller 112, as indicated by line 124. The system controller 112 stores the digital values, and calculates for each of the digital values a deviation of the respective digital value from a pixel reference value. The pixel reference value corresponds to an ideal digital value that would be produced for each pixel in the absence of light collection efficiency variation and laser beam intensity variation. Based on the calculated deviation, system controller 112 calculates for each of the digital values a multiplicative weighting factor sufficient to adjust the respective digital value to eliminate the deviation from the ideal pixel reference value. The system controller then stores the multiplicative weighting factor in a collector correction table 126, as indicated by line 128, for access during a normal digitization mode. In the normal digitization mode, a multiplier 130 accesses collector correction table 126, as indicated by line 132, to obtain the multiplicative weighting factor for each pixel. Although multiplier 130 is represented by a discrete component in FIG. 5, its function may be implemented by system controller 112. The system controller 112 and multiplier 130 are synchronized with a pixel clock (not shown) to store and access, respectively, the weighting factors for appropriate pixels. The multiplier 130 receives the digital values from data acquisition system 32, as indicated by line 134. The multiplier 130 then adjusts the digital values for the appropriate pixels received from data acquisition system 32 according to the weighting factor, thereby substantially eliminating deviation due to fixed-pattern collection efficiency variation and laser beam intensity variation.

Figure 6:
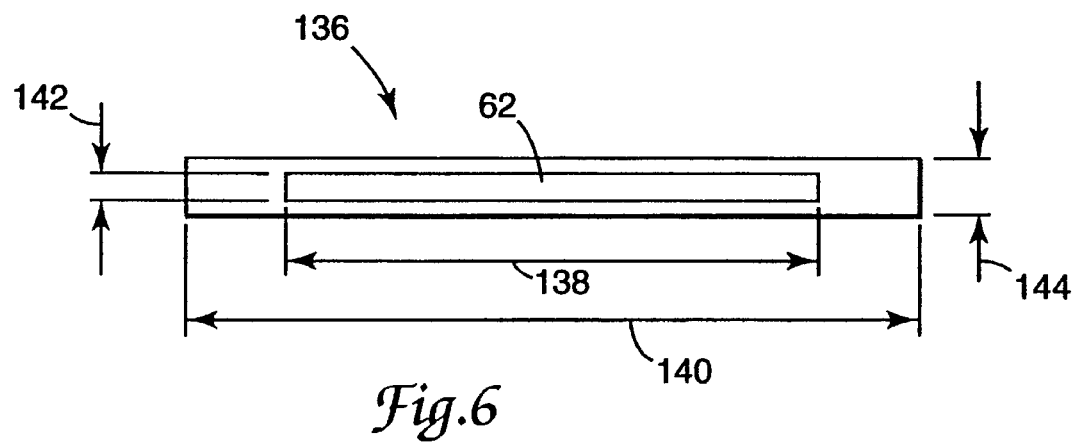
FIG. 6 is front view of a photodiode incorporating a mask for improving response time, in accordance with the present invention.

FIG. 6 is a front view of a photodiode 48 incorporating a mask 136 for improving response time, in accordance with the present invention. In addition to the dead space existing between active areas 62 of adjacent photodiodes 48, the active area of each individual photodiode includes regions that are less responsive than other regions. Specifically, part of the periphery of active area 62 is not metallized. A low electric field exists in the nonmetallized regions of active area 62, relative to metallized regions. As a result, charge generated in the nonmetallized regions of active area 62 in response to light received via diffusing member 56 requires a much longer time to reach the back electrode of photodiode 46. The delayed charge produced in the nonmetallized regions increases the signal settling time. The mask 136 is sized to substantially cover the nonmetallized regions of active area 62, thereby substantially preventing light from reaching such regions. With mask 136 in place, the nonmetallized regions do not receive light, and therefore do not produce a delayed charge that can increase the signal settling time of the overall photodiode 48. For a S2551-01 PIN silicon photodiode from Hamamatsu, for example, mask 136 preferably is sized to cover active area 62 such that an area having a length 138 of 29 millimeters, relative to a photodiode length 140 of 40 millimeters, and a height 142 of 1.2 millimeters, relative to a photodiode height 144 of 3.0 millimeters, is exposed to incoming light. These dimensions correspond to those described above with respect to FIG. 2.

Figure 7:
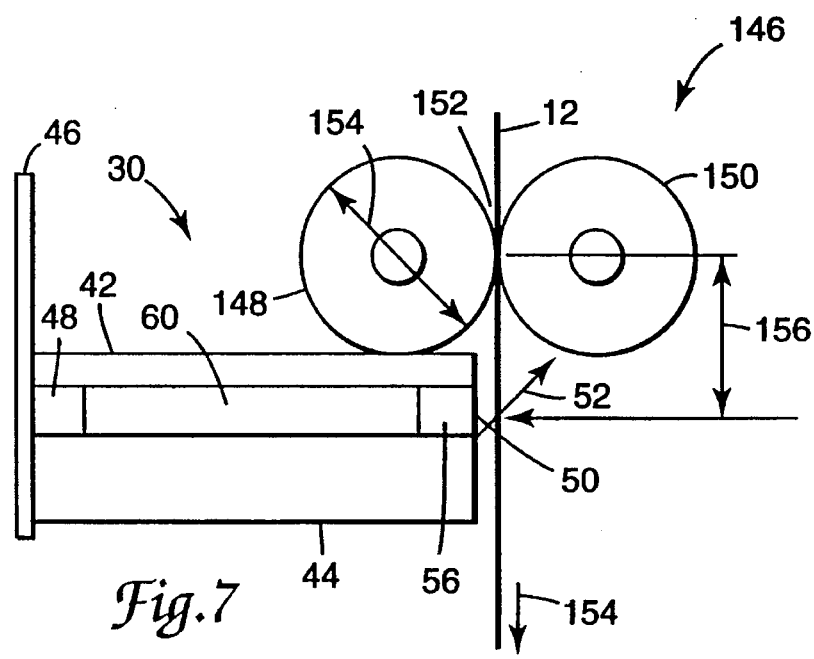
FIG. 7 is a side view of an exemplary transport mechanism for transporting a sheet of film relative to the light collection device of FIG. 2, in accordance with the present invention.

FIG. 7 is a side view of an exemplary transport mechanism 146 for transporting film sheet 12 relative to light collection device 30 of FIG. 2, in accordance with the present invention. As shown in FIG. 7, transport mechanism 146 comprises a single pair of rollers positioned adjacent light collection device 30 immediately above light receiving aperture 50. The single pair of rollers includes a drive roller 148 and a guide roller 150. The functions of rollers 148, 150, i.e., drive versus guide, can be exchanged. The rollers 148, 150 define a nip contact 152 for receiving film sheet 12 and driving the film sheet in a direction substantially perpendicular to scan line 52. An arrow 154 indicates a direction of travel of film sheet 12.

The use of a single pair of rollers 148, 150 implies that a trailing edge of film sheet 12 cannot be digitized. The rollers 148, 150 preferably have extremely small diameters, however, that minimize the amount of film at the trailing edge that cannot be accessed for digitization. In particular, rollers 148, 150 preferably are sized to have diameters 154 of less than approximately 16 millimeters. A diameter 154 of approximately 16 millimeters will leave a trailing edge of approximately 8 millimeters inaccessible for digitization. An undigitized band of approximately 8 millimeters at a top edge of film sheet 12 typically will not be a problem, however, because this top band ordinarily will not be viewed. Instead, the top 8 millimeter band normally will be covered by a film holding clip associated with the film view box. Smaller diameters may be desirable to allow a degree of clearance between the scanned laser beam 17 and rollers 148, 150. The clearance avoids reflection of the scanned laser beam 17 from the surfaces of rollers 148, 150. For example, a diameter 154 of approximately 10 millimeters has been observed to produce a minimal undigitized band 156 of approximately 8 millimeters with a clearance of approximately 3 millimeters between the scanned laser beam 17 and rollers 148, 150.

In one exemplary embodiment, each of rollers 148, 150 can be approximately 10.5 millimeters in diameter and approximately 38.1 centimeters in length. The length of approximately 38.1 centimeters (15 inches) is large enough to accommodate the width of film sheets sized for chest radiography, i.e., 35.56 centimeters (14 inches). The small rollers 148, 150 may deflect due to the pressures occurring at nip contact 152. The rollers 148, 150 may be provided with a "crowned" surface to compensate for the deflection and provide a uniform nip pressure, thereby driving film sheet 12 in a controlled manner. With the crowned surface, each of rollers 148 has a greater diameter at a center position along the roller length, than at end positions. A resilient covering also may be applied to rollers 148, 150 to provide added pressure uniformity across the surfaces of the rollers.

The use of a single pair of rollers 148, 150 provides a number of advantages over a digitizing apparatus incorporating two pairs of rollers. For example, the single pair of rollers 148, 150 reduces the cost and size of the overall digitizing apparatus. In addition, a single pair of rollers 148, 150 avoids the mechanical shock that can be applied to film sheet 12 upon introduction to the nip contact of a second set of rollers. The mechanical shock can skew or deform the film sheet 12, causing visible artifacts in the digitized image. Further, with a single pair of rollers 148, 150, motion control does not need to be coordinated between two different drives that can produce skewing and deformation due to deviation from one another.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. An apparatus for digitizing an image formed on a sheet of film, the apparatus comprising:

a light source for emitting a beam of light;

a mechanism for scanning said beam of light in a scan line across said sheet of film to illuminate a plurality of pixels on said sheet of film;

a light collection device including:

a housing having an elongated aperture extending along said scan line, said aperture receiving light transmitted through said sheet of film from said light source;

a diffusing member, disposed within said aperture and extending along said scan line, for optically diffusing the light received by said aperture, a linear array of photodiodes, disposed within said housing and extending along said scan line, for detecting the light diffused by said diffusing member, said linear array of photodiodes being displaced a distance from said diffusing member, and each of said photodiodes generating an analog signal representing an intensity of the detected light for each of said pixels, and a summing circuit, coupled to each of said photodiodes, for summing the analog signals generated by said photodiodes for each of said pixels to produce an output analog signal representing an overall intensity of said light transmitted through said sheet of film from said light source for each of said pixels; and an analog-to-digital converter, electrically coupled to said summing circuit, for converting said output analog signal for each of said pixels to a digital value.

2. The digitizing apparatus of claim 1, wherein said diffusing member comprises an opalescent plastic material.

3. The digitizing apparatus of claim 1, wherein said aperture has a length of approximately 360 millimeters extending along said scan line, and a height in a range of approximately 2 to 4 millimeters.

4. The digitizing apparatus of claim 1, wherein said housing includes one or more reflective interior surfaces.

5. The digitizing apparatus of claim 1, wherein said light collection device further comprises a mask disposed over each of said photodiodes, said mask covering a portion of an active area of each of said photodiodes to substantially prevent impingement of said diffused light on said portion, said portion of said active area covered by said mask exhibiting a slower response to said diffused light than other portions of said active area.

6. The digitizing apparatus of claim 1, further comprising a mechanism for transporting said sheet of film in a direction perpendicular to said scan line, said transporting mechanism including a single pair of rollers, said single pair of rollers including a drive roller and a guide roller defining a nip contact for receiving said sheet of film and driving said sheet of film in said direction perpendicular to said scan line.

7. The digitizing apparatus of claim 1, further comprising:

means for activating said light source, said scanning mechanism, said light collection device, and said analog-to-digital converter to perform a calibration digitization mode in which said scanning mechanism scans said light beam in said scan line across said aperture of said light collection device without presence of said sheet of film;

means for storing the digital values generated by said analog-to-digital converter for said pixels during said calibration digitization mode;

means for calculating, for each of the digital values, a deviation of the respective digital value from a pixel reference value;

means for calculating, for each of the digital values, a weighting factor sufficient to adjust the respective digital value to eliminate the deviation; and means for adjusting each of said digital values, during a normal digitization mode of said digitizing apparatus, according to the weighting factor calculated for the respective digital value, thereby substantially eliminating said deviation.

8. The digitizing apparatus of claim 7, wherein said pixel reference value is calculated to eliminate in each of the digital values deviation caused by ripple in said overall analog signal.

9. The digitizing apparatus of claim 1, wherein said summing circuit includes a plurality of first stage summing circuits, each of said first stage summing circuits summing the analog signals generated by one or more of said photodiodes to produce a summed analog signal, and a second-stage summing circuit for summing the summed analog signals produced by said first stage summing circuits to produce said output analog signal.

10. A light collection device for use in an apparatus for digitizing an image formed on a sheet of film, wherein the apparatus comprises a light source for emitting a beam of light, and a mechanism for scanning said beam of light in a scan line across said sheet of film to illuminate a plurality of pixels on said sheet of film, the light collection device comprising:

a housing having an elongated aperture extending along said scan line, said aperture receiving light transmitted through said sheet of film from said light source;

a diffusing member, disposed within said aperture and extending along said scan line, for optically diffusing the light received by said aperture;

a linear array of photodiodes, disposed within said housing and extending along said scan line, for detecting the light diffused by said diffusing member, said linear array of photodiodes being displaced a distance from said diffusing member, and each of said photodiodes generating an analog signal representing an intensity of the detected light for each of said pixels; and a summing circuit, coupled to each of said photodiodes, for summing the analog signals generated by said photodiodes for each of said pixels to produce an output analog signal representing an overall intensity of said light transmitted through said sheet of film from said light source for each of said pixels.

11. The device of claim 10, wherein said diffusing member comprises an opalescent plastic material.

12. The device of claim 10, wherein said aperture has a length of approximately 360 millimeters extending along said scan line, and a height in a range of approximately 2 to 4 millimeters extending in a direction perpendicular to said scan line.

13. The device of claim 10, wherein said housing includes one or more reflective interior surfaces.

14. The device of claim 10, wherein said light collection device further comprises a mask disposed over each of said photodiodes, said mask covering a portion of an active area of each of said photodiodes to substantially prevent impingement of said diffused light on said portion, said portion of said active area covered by said mask exhibiting a slower response to said diffused light than other portions of said active area.

15. The device of claim 10, wherein said summing circuit includes a plurality of first stage summing circuits, each of said first stage summing circuits summing the analog signals generated by one or more of said photodiodes to produce a summed analog signal, and a second-stage summing circuit for summing the summed analog signals produced by said first stage summing circuits to produce said output analog signal.

16. An apparatus for digitizing an image formed on a sheet of film, the apparatus comprising:

a light source for emitting a beam of light;

a mechanism for scanning said beam of light in a scan line across said sheet of film to illuminate a plurality of pixels on said sheet of film;

a mechanism for transporting said sheet of film in a direction perpendicular to said scan line, said transporting mechanism including a single pair of rollers, said single pair of rollers including a drive roller and a guide roller defining a nip contact for receiving said sheet of film and driving said sheet of film in said direction perpendicular to said scan line;

a light collection device for detecting light transmitted through said sheet of film from said light source, and for generating an analog signal representing an intensity of the detected light for each of said pixels; and an analog-to-digital converter, electrically coupled to the light collection device, for converting said analog signal generated by the light collection device for each of said pixels to a digital value.

17. An apparatus for digitizing an image formed on a sheet of film, the apparatus comprising:

a light source for emitting a beam of light;

a mechanism for scanning said beam of light in a scan line across said sheet of film to illuminate a plurality of pixels on said sheet of film;

a light collection device for detecting light transmitted through said sheet of film from said light source, and for generating an analog signal representing an intensity of the detected light for each of said pixels; an analog-to-digital converter, electrically coupled to the light collection device for converting said analog signal generated by the light collection device for each of said pixels to a digital value; and a calibration device comprising:

means for activating said light source, said scanning mechanism, said light collection device, and said analog-to-digital converter to perform a calibration digitization mode in which said scanning mechanism scans said light beam in said scan line across said aperture of said light collection device without presence of said sheet of film, means for storing the digital values generated by said analog-to-digital converter for said pixels during said calibration digitization mode, means for calculating, for each of the digital values, a deviation of the respective digital value from a pixel reference value, means for calculating, for each of the digital values, a weighting factor sufficient to adjust the respective digital value to eliminate the deviation, and means for adjusting each of said digital values, during a normal digitization mode of said digitizing apparatus, according to the weighting factor calculated for the respective digital value, thereby substantially eliminating said deviation.

18. An apparatus for digitizing an image formed on a sheet of film, the apparatus comprising:

a light source for emitting a beam of light;

a mechanism for scanning said beam of light in a scan line across said sheet of film to illuminate a plurality of pixels on said sheet of film;

a light collection device including:

a housing having an elongated aperture extending along said scan line, said aperture receiving light transmitted through said sheet of film from said light source, wherein said housing includes one or more reflective interior surfaces;

a diffusing member, disposed within said aperture and extending along said scan line, for optically diffusing the light received by said aperture, a linear array of photodiodes, disposed within said housing and extending along said scan line, for detecting the light diffused by said diffusing member, said linear array of photodiodes being displaced a distance from said diffusing member, and each of said photodiodes generating an analog signal representing an intensity of the detected light for each of said pixels, and a summing circuit, coupled to each of said photodiodes, for summing the analog signals generated by said photodiodes for each of said pixels to produce an output analog signal representing an overall intensity of said light transmitted through said sheet of film from said light source for each of said pixels; and an analog-to-digital converter, electrically coupled to said summing circuit, for converting said output analog signal for each of said pixels to a digital value.

19. A light collection device for use in an apparatus for digitizing an image formed on a sheet of film, wherein the apparatus comprises a light source for emitting a beam of light, a mechanism for scanning said beam of light in a scan line across said sheet of film to illuminate a plurality of pixels on said sheet of film, the light collection device comprising:

a housing having an elongated aperture extending along said scan line, said aperture receiving light transmitted through said sheet of film from said light source, wherein said housing includes one or more reflective interior surfaces;

a diffusing member, disposed within said aperture and extending along said scan line, for optically diffusing the light received by said aperture;

a linear array of photodiodes, disposed within said housing and extending along said scan line, for detecting the light diffused by said diffusing member, said linear array of photodiodes being displaced a distance from said diffusing member, and each of said photodiodes generating an analog signal representing an intensity of the detected light for each of said pixels; and a summing circuit, coupled to each of said photodiodes, for summing the analog signals generated by said photodiodes for each of said pixels to produce an output analog signal representing an overall intensity of said light transmitted through said sheet of film from said light source for each of said pixels.

* * * * *